Oct. 8, 1968 B. C. BIEGA ET AL 3,405,348
VOLTAGE REGULATING SYSTEM WITH AN INDUCTIVE POTENTIAL DIVIDER
INCLUDING A MAGNETIC AMPLIFIER
Filed Oct. 24, 1965 2 Sheets-Sheet 2

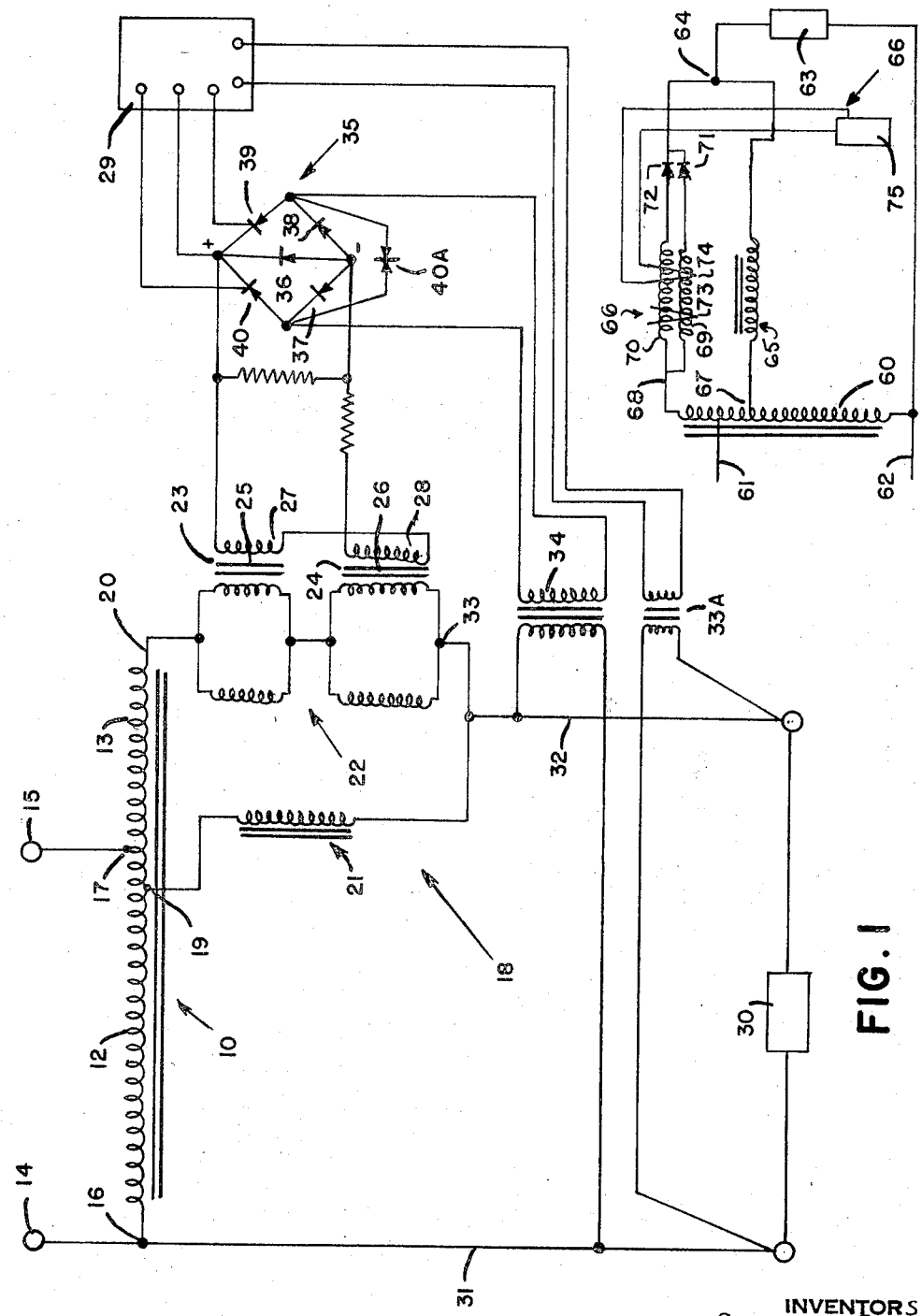

INVENTORS
BOLESLAW C. BIEGA
ALOYSIUS J. HAUCK
BY
Robertson Smythe Ogens Parmelee
ATTORNEYS United States Patent Office 3,405,348
Patented Oct. 8, 1968

3,405,348
VOLTAGE REGULATING SYSTEM WITH AN INDUCTIVE POTENTIAL DIVIDER INCLUDING A MAGNETIC AMPLIFIER
Boleslaw C. Biega, Deerfield, Ill., and Aloysius J. Hauck, Milwaukee, Wis., assignors to Sola Basic Industries, Inc., a corporation of Wisconsin
Filed Oct. 24, 1965, Ser. No. 504,555
5 Claims. (Cl. 323—89)

ABSTRACT OF THE DISCLOSURE

A voltage regulating system in which an inductive potential divider having a variable impedance device and a linear impedance device is connected to the load side of a transformer having unidirectionally wound main and extension windings. Regulation is obtained by controlling the reactance of the variable impedance device.

---

This invention relates to power modulators and especially to a system and modulator or regulator for use as a line voltage or constant voltage regulator.

Available supply voltage may vary considerably depending upon numerous factors. Line voltage fluctuation due to a regulation within the feeder is a function of the impedance of the line and the step-down transformers. In isolated locations of utility network systems, fluctuations may become severe and of long duration. As an example, in industrial plants and large commercial installations, voltage fluctuations of significant magnitude are caused by intermittent loads such as compressors, welders, cranes, elevators, ovens and so forth. To compensate for voltage fluctuations, various types of automatic voltage regulating equipment have been used.

One of the problems found in prior systems for regulating voltage or current has been that they are relatively expensive and that they have not been sufficiently fast in response for satisfactory operation.

The principal object of the invention is to provide a power modulator which will provide the desired waveform and at the same time be fast.

Another object of the invention is to provide a system or device which can use solid-state control devices in order to reduce size and weight, and so as to increase the speed of response.

In one aspect of the invention, the core has a winding thereon which can be a single winding in an autotransformer configuration wherein the winding is unidirectional or may be a pair of windings in transformer relationship. The single or main winding may have an extension thereof mounted on the core and in serial unidirectional relationship. An inductive potential divider is used which has at least a pair of impedances, preferably two, which are connected together and have terminals connected at spaced points along said winding or winding and extension.

In one form, the power input is connected at spaced points to the winding and the load is connected to a point between at least two of the impedances.

The impedances are reactors, at least one of which is variable or non-linear. The variable saturable reactor may be controlled by a D.C. control winding which is connected to a load sensing arrangement.

In another form, one of the impedances can be of the self-saturating magnetic amplifier type having control and bias windings.

The invention also can be employed in conjunction with a polyphase system. If it is a four-wire three-phase system, the neutral can be connected to the common point of the three-phase windings of the transformer. If a three-phase three-wire system is involved, the common point of the three winding is isolated and stabilization can be obtained by means of a zig-zag connected grounding transformer or by means of a delta tertiary winding. The inductive potential divider can be connected in the phases following the single phase arrangement.

In all of the above, the winding across which the potential divider is connected is unidirectional in character.

FIG. 1 is a circuit diagram showing one form of the invention, some portions being in block representation.

FIG. 2 is a circuit diagram showing another form of the invention.

Figure 3:
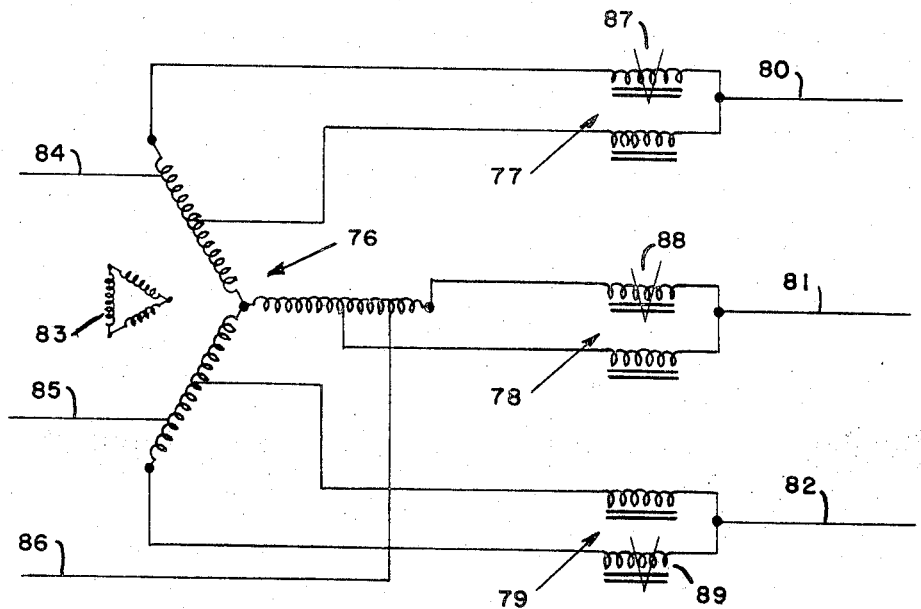
FIGS. 3 and 4 are circuit diagrams showing further forms of the invention.

The invention will be described first in conjunction with a single phase arrangement but as will appear later, it can be used for polyphase systems.

Referring to FIG. 1, winding 10 is wound on a core in a conventional manner. In the form shown, it has a main winding portion 12 and an extension 13. The input terminals 14, 15 are connected to a suitable source of A.C., the input being connected at spaced points 16, 17 to the winding 10.

The inductive potential divider shown generally at 18 is connected at spaced points 19, 20 to winding 10. In the form shown in FIG. 1, the potential divider consists of a pair of reactors 21, 22. Reactor 21 is a linear reactor. Variable saturable reactor 22 may have two portions 23, 24 having separate cores 25, 26 respectively. Control windings 27, 28 receive D.C. control energy determined by the controller 29.

Load 30 is connected by leads 31 and 32 to a point 33 between reactor 21 and 22 and to the winding means 10. The connection to the winding means does not necessarily have to be at the end thereof.

Output sensing transformer 33A provides a signal to controller 29 which may be of any suitable type. Transformer 34 provides power for rectifier control bridge 35. The control bridge has silicon rectifiers 36, 37, 38 and silicon controlled rectifiers 39, 40 as is known in the art. The silicon controlled rectifiers are connected to the controller 29 so as to control the level of D.C. delivered or furnished to windings 27, 28 in accordance with the output to the load. If desired, a "Voltrap" 40A as made by Westinghouse can be connected across the bridge so as to protect the rectifier from transient voltages.

Thus, it can be seen that a shift of output voltage across 30 will be obtained which is a function of the ratio of the effective value of reactors 21 and 22, such being controlled by the D.C. in the control windings 27, 28. It has been found that the specified output voltage will be maintained from no-load to rated full load. When the output voltage drops below the preset value, the feedback or control signal turns the controller to the condition that will return the output voltage to a predetermined value.

FIG. 2 is generally similar to FIG. 1 except that a self-saturating reactor with control and bias winding is used. Winding 60 is fed by A.C. from lines 61, 62. Load 63 is connected to point 64 of the potential divider and the winding 60. Reactor 65 and reactor network 66 are connected to spaced points 67, 68 of winding 60. Reactor network 66 may comprise winding 69, 70 and diodes 71, 72. Bias winding 73 and control winding 74 are associated with winding 69, 70, control winding 74 being connectable to a control system 75 similar to the control system of FIG. 1.

The arrangement now will be described in conjunction with a polyphase system, a three-phase circuit being used for illustration. In FIG. 3, the transformer portion 76 can be built in the form of a three-leg core transformer with one leg per phase. The transformer windings are connected to a Y configuration. Three separate sets of linear and non-linear saturable core reactors 77, 78, 79 are required, one set for each phase, 80, 81, 82 respectively. A delta stabilizing tertiary winding 83 such as is known in the art can be used. The three-phase input is connected by leads 84, 85, 86 to the respective windings of transformer 76. Control windings 87, 88, 89 are schematically shown, these windings being connected to a suitable control circuit means (not shown) which will function in a manner similar to that described previously. The nonlinear reactor of each potential divider needs to be located as shown.

Figure 4:
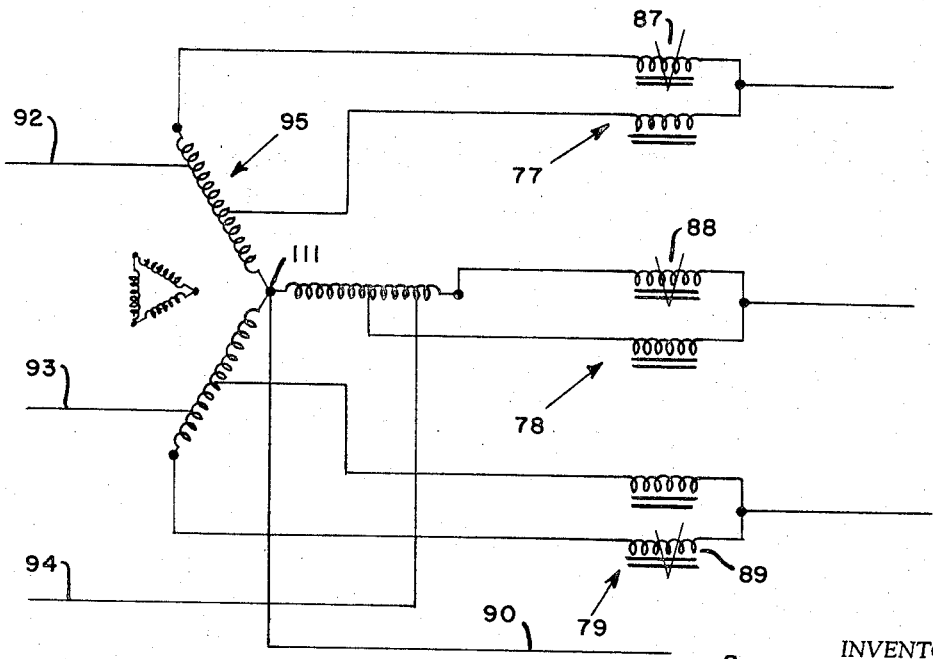

Referring to FIG. 4, a three-phase four-wire system is illustrated, the neutral wire 90 being connected to the common point 111 of the three phase winding configuration of the transformer. In a three-phase three-wire system, such as derived from a delta connected transformer, the common point of the three windings remains isolated. Input leads 92, 93, 94 are connected to the transformer 95 in a manner similar to that of FIG. 3. The saturable reactors and control windings are the same as FIG. 3 and have been given the same reference numerals.

The required stabilization for line to neutral loads is afforded by the delta tertiary winding.

It should be apparent that details of the invention can be varied without departing from the spirit of the invention except as defined in the appended claims.

What is claimed is:

1. In a power modulator for supplying energy to a load means, the combination including core means, unidirectional winding means on said core means, said winding means including a main winding and an extension winding, means for supplying an A.C. input to said main winding, an inductive potential divider comprising at least two inductive impedance devices, means connecting one of said inductive impedance devices to said extension winding adjacent the outer end thereof, means connecting a second of said inductive impedance devices to a spaced point on said winding means, one of said last named impedance devices being linear and the other variable, means connecting the other ends of said inductive impedance devices to each other and to an output terminal, means connecting the end of said main winding most distant from said extension winding to a second output means, and control means for varying the inductance of said variable impedance device.

2. A power modulator as defined in claim 1 in which at least one of said inductive impedance devices is connected to a point on said main winding means.

3. A power modulator as defined in claim 2 in which a linear inductive impedance device is connected to said main winding.

4. The circuit according to claim 3 wherein there are a plurality of unidirectional winding means having a polyphase A.C. input connected thereto, and a plurality of inductive potential dividers are connected in the outputs of the phases from said winding means.

5. The circuit according to claim 4 wherein the plurality of unidirectional winding means are connected in Y configuration with the input.

References Cited

UNITED STATES PATENTS

| | | | |
|---|---|---|---|
| 2,714,188 | 7/1955 | Scherer | 323—66 |
| 2,790,135 | 4/1957 | Bennett et al. | 323—89 |
| 2,839,719 | 6/1958 | Artzt | 323—45 |
| 3,210,637 | 10/1965 | Gams | 323—89X |
| 3,268,798 | 8/1966 | Burski | 323—66 |
| 3,353,093 | 11/1967 | Peterson | 323—43 |

MILTON O. HIRSHFIELD, *Primary Examiner.*

W. E. RAY, *Assistant Examiner.*